United States Patent [19] [11] 3,784,065
Patfoort [45] Jan. 8, 1974

[54] INJECTION
[76] Inventor: George Arthur Rodolf Patfoort, Maldegem-Kleit, Belgium
[22] Filed: July 12, 1971
[21] Appl. No.: 161,440

[30] Foreign Application Priority Data
Apr. 15, 1971 Belgium .............................. 102219

[52] U.S. Cl.................. 222/413, 425/208, 425/209
[51] Int. Cl............................................. B29b 3/02
[58] Field of Search........................... 222/412, 413; 425/207, 208, 209

[56] References Cited
UNITED STATES PATENTS
3,124,841  3/1964  Kaji................................. 222/413 X
3,411,213  11/1968 Spinello.......................... 222/413 X
2,994,459  8/1961  Tedeschi......................... 222/412 X
3,335,461  8/1967  Schwartz......................... 222/413 X
2,744,287  5/1956  Parshall et al. .................... 425/208
3,176,877  4/1965  Ciani et al. ...................... 222/413 X
R23,240    6/1950  Magerkurth et al................ 425/207

FOREIGN PATENTS OR APPLICATIONS
1,095,237  12/1967  Great Britain...................... 425/209

Primary Examiner—Samuel F. Coleman
Assistant Examiner—Joseph J. Rolla
Attorney—William Anthony Drucker

[57] ABSTRACT

The invention provides a method of injecting by forcing, and apparatus for carrying out that method, which comprises the steps of (i) introducing material to be injected into a cylinder, (ii) compressing the solid material to injection pressure by rotating a screw in said cylinder, (iii) preventing said solid material at least to a large extent from slipping counter to the direction of rotation of the screw to achieve this pressure, (iv) plasticizing the solid material in a small space outside the zone where pressure is generated, and (v) injecting the plasticised material by forcing into a mould by means of the pressure generated in the solid material.

13 Claims, 4 Drawing Figures

PATENTED JAN 8 1974　　　　　　　　　　　　　　3,784,065

INJECTION

This invention relates to a device and a method of injecting by forcing which uses the pressure exerted on the solid material by the rotation of a screw as the sole source of pressure for injection of the plastic material.

All injection methods known to date use two separate operations: first, plasticising the material, then injection. These two operations are carried out either with different components or with the same component fulfilling two different functions one after the other.

Thus, for example, some injection machines use a plasticiser wherein the material is changed from a solid state to a plastic state, this plastic material then being taken into a chamber where a piston imparts the necessary injection pressure to it. Other machines use a plasticiser wherein, once the material has been plasticised, an axial translatory movement is imparted to the screw and it serves as a piston.

The need for these two successive operations is due to the design of the plasticising screws used up to now in injection machines. In fact, the screws at present used in such machines comprise, in principle, three successive zones: a feed zone, a compression zone where the material is changed into a viscous state and finally a metering zone where the flow and pressure of the viscous material are adjusted. Since the pressure is obtained in the latter two zones within the viscous mass itself, it is difficult to achieve high pressures without reducing the flow for a given type of screw, and in particular, it is impossible to obtain these pressures instantaneously, as the increase in pressure occurs gradually, coming from the viscous mass. This explains the need to provide a piston device, as this latter enables immediate pressure and considerable flow, largely independent of back pressure, to be obtained. In fact, in a standard screw the flow is dependent on back pressure. This means that during filling of the mould, the flow decreases as the mould fills and the resistance to filling increases proportionately.

The object of this invention is to simplify injection methods and devices considerably by providing the injection machine with a plasticiser capable of supplying instantaneously the necessary injection pressures, and thus permit injection by forcing.

The method according to the invention is mainly characterised in that the solid material is compressed to injection pressure by rotating a screw, in that the solid material is prevented, at least to a large extent, from slipping counter to the direction of rotation of the screw to achieve this pressure, in that the solid material is plasticised in a small space outside the zone where pressure is engendered, and in that the plasticised material is injected by forcing into a mould by means of the pressure engendered in the solid material.

A better understanding of the invention will be gained be reference to the description in conjunction with the accompanying drawing which shows as an example only three embodiments of the invention.

Figure 1:
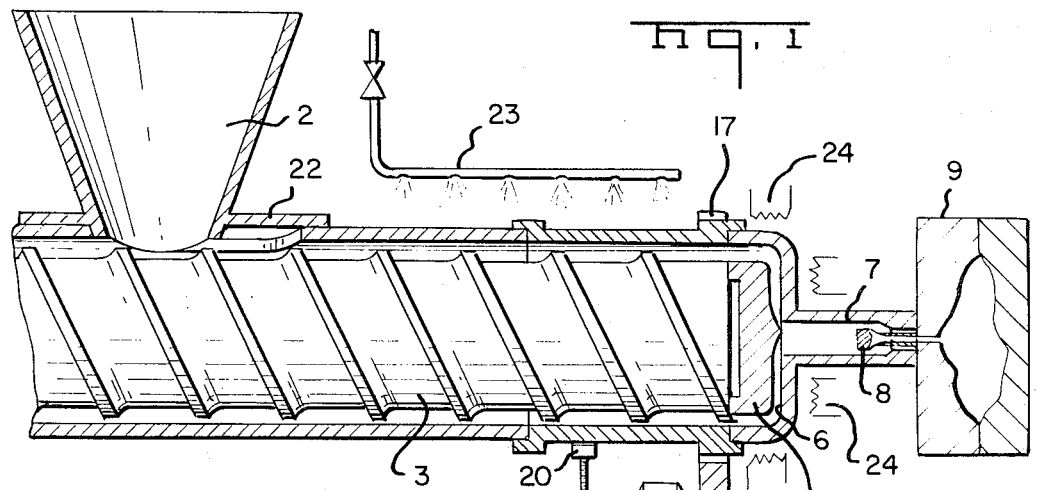
FIG. 1 is a diagrammatic view of an injection device in accordance with the invention.

In the embodiment illustrated diagrammatically in FIG. 1, an injection machine comprises a chamber 1 which is fitted with a feed device 2 and contains a screw 3. At the end of the screw 3 there is a plasticising zone 4. In this zone, plasticising is effected between a thermal shield 5 and the end 6 of the chamber 1. This zone is followed by an injection nozzle 7 comprising a non-return valve 8. The injection nozzle 7 opens, via the valve 8, into a mould 9.

The solid material is introduced into the chamber 1 through the feed device 2 and is subjected to the action of the screw 3. This action compresses the solid material and carries it toward the back of th chamber 1.

The material then reaches the plasticising zone 4, where, by the effect of the rotation of the screw in relation to the back of the chamber 1, the material is brought to a plasticised state by shearing and homogenised under pressure, this pressure having been generated in the feed zone on the solid material; this same pressure is used to effect injection by forcing.

It will be noted that this method completely eliminates the need for a piston which exists in all injection machines known to date.

This method of operation is made possible by the fact that a device is used wherein the zone for plasticising the material is situated outside the zone where pressure is generated and, moreover, this plasticising zone covers a comparatively small space. In fact, this arrangement makes it possible to obtain pressure from the solid material and consequently makes it possible not only to achieve high pressures independently of the flow, but in particular to obtain these pressures almost instantaneously, a condition which is essential to satisfactory injection. If an attempt were made to put this method into operation using conventional screws, difficulty would be encountered in obtaining the required pressures extremely quickly since, pressure being generated within a viscous mass, a back flow is set up due to the back pressure and the flow decreases as the back pressure increases and there is then a slow increase in pressure and a decrease in flow, which leads to quite unacceptable filling of the mould.

Conversely, with this device, the flow of injected material is, if necessary, solely a function of the rotation of the screw, since the back flow can be eliminated, and this allows the potentialities of the machine and the material to be exploited to the utmost.

A screw with a longer plasticising zone but whose pressure is generated in the feed zone on solid material will give results of the same kind, but with decreased efficiency.

Arrangements can be made completely to eliminate the risk of a return flow which might nevertheless be set up in the solid material, or to control it.

Thus, in the device shown FIG. 1, either an adjustable rotary movement in the opposite direction to the direction of rotation of the screw 3 or a movement in the same direction controlled by a brake, can be imparted to a portion of the chamber 1. For this purpose the part 1a is provided with teeth 17 driven by a gear 18 operated by a motor 19; a brake show 20 is capable of being clamped by the screw 21 against the driven part 1a. A portion can also be grooved, for the same purpose. The pressure can be made adjustable by providing a feed aperture which can be shifted along the cylinder. For this purpose, the supply device 2 is provided with an apron 22 making it possible for it to move on the chamber 1, so as to reduce or increase the useful length of the screw.

Yet other devices can be provided such as, e.g., forced feed in a hopper or in an auxiliary feed device, selection of the shape of the granules and their grainsize range as well as their surface state, etc.

In this way, extremely high pressures can be achieved which are, moreover, instantaneously available in the feed zone and consequently in the plastic material at the time of injection as well.

The device shown in the drawing has been fitted with a non-return valve 8; this makes it possible to start the machine before injection, or even to allow it to run continuously.

However, it is obvious that this valve could also be omitted, injection being effected by starting up the screw 3 and ceasing when the screw stops.

It is also obvious that, for a given injection, a variable pressure cycle suited at all times to optimum injection conditions can be provided by adjusting e.g. the rotation speed of the screw 3.

Similarly, a thermal shield 5 has been provided in the plasticising zone with a view to preventing the heat from reaching the screw 3 and thus preventing premature plasticising of the solid material.

However, in some cases, according to the material used and the operating conditions, this shield may also be omitted.

Figure 2:
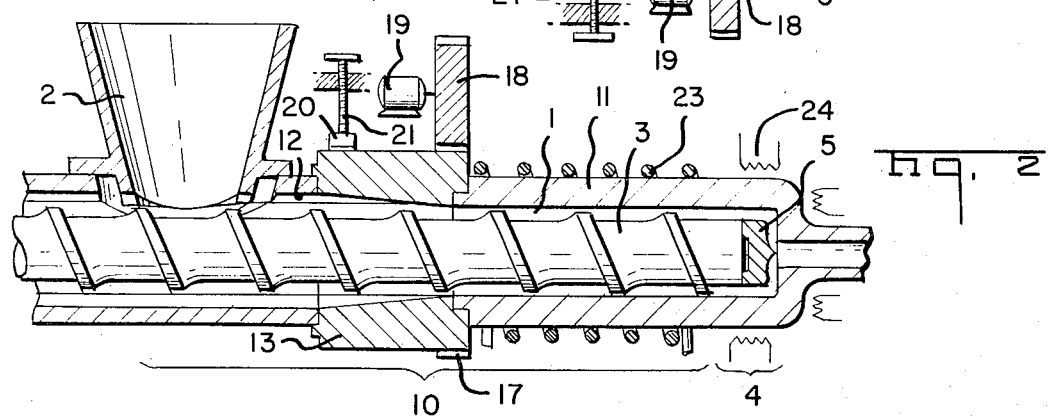
FIG. 2 shows, diagrammatically, a longitudinal section of plasticising device for injection comprising a mobile cylinder portion.
Figure 3:
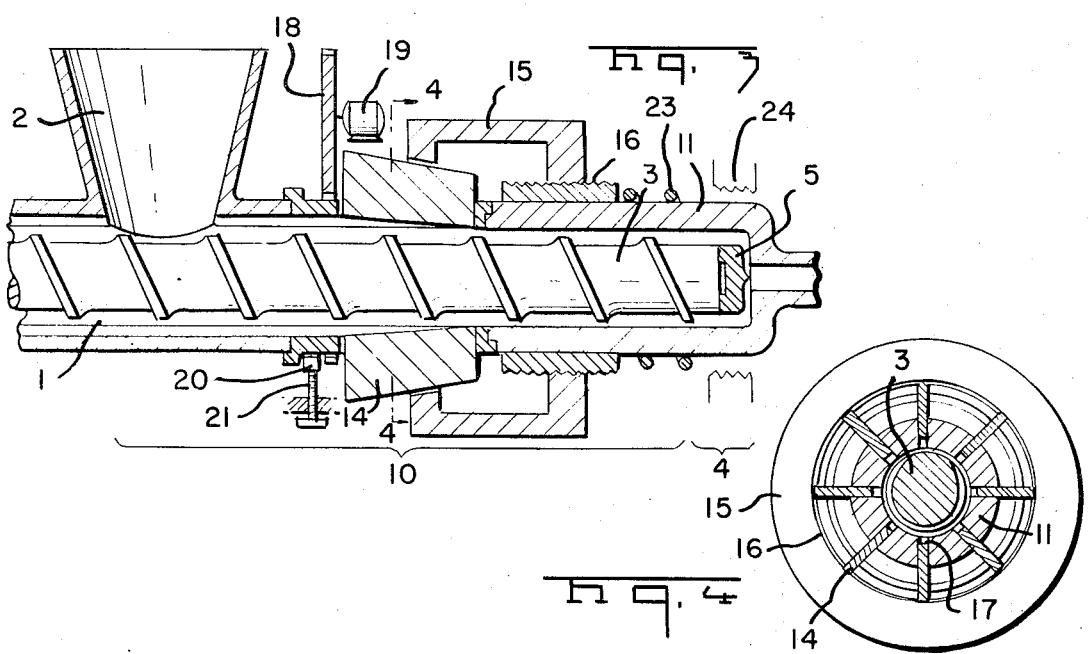
FIG. 3 shows again diagrammatically, a longitudinal section of a plasticising device for injection, the cylinder of which is provided with grooves whose depth is adjustable.
Figure 4:
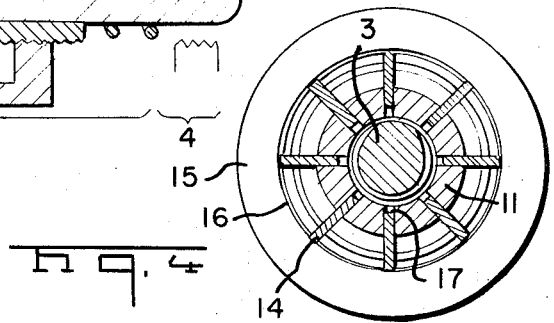
FIG. 4 is a section along IV—IV of FIG. 3.

Referring to FIGS. 2 and 3, the device comprises a chamber 1, which is equipped with a feed device 2 and contains a screw 3. At the end of the screw there is a plasticising zone 4, where plasticising of the material is carried out, this plasticising zone 4 being preceded by a pressure and feed zone 10. The chamber 1 is formed in a cylinder 11.

In accordance with an embodiment shown in FIG. 2, there are grooves 12 in the cylinder 11 while at least a portion 13 of the grooved cylinder 11 situated in the pressure and feed zone 10 is made mobile and its own rotary movement can be imparted to it.

Referring to FIG. 3, grooves 12 are also formed in the cylinder 11, while at least over a portion of the length of the grooves 12 the depth of the said grooves is made adjustable by means of mobile back pieces 14 the depth of insertion of which is governed by the position of an adjusting bow 15 moving along a threaded ring 16.

In accordance with the embodiment in FIG. 2, a rotary movement, mainly in the direction of movement of the screw, can be imparted to the portion 13 of the cylinder 11. The movement of the portion 13 of the cylinder 11 is equivalent in fact to making the prevention of slip by the solid material, in relation to a cylinder assumed to be fixed, more or less effective. In this way, the device allows the pressure and the flow in the feed and pressure zone 10 to be controlled.

In the embodiment of FIG. 3, the prevention of slipping by the solid material is made more or less effective according to the greater or lesser depth of the grooves.

It goes without saying that the less chance the solid material is given of adhering to the walls of the chamber 1, i.e. by reducing the depth of the grooves 12 formed in the cylinder 11, the more the solid material will tend to slip on these walls. A means for controlling the pressure and the flow in the feed and pressure zone 10 is therefore also available, by varying the depth of the grooves 12 by moving the adjusting bow 15 on the screwed ring 16, causing the position of the mobile back pieces 14, and consequently the depth of the grooves 12, to change.

The two devices described above can also be combined to obtain a mobile portion with an adjustable groove depth. Similarly, they can cover a portion only of the feed and pressure zone, or the whole of this zone.

The pressure and flow in the zone 10 could also be adjusted by measuring the quantity of material fed, and the effective length of the screw 3 thereby adjusted, by leaving a specific length of the said screw empty of material.

In some cases, it is useful to increase the shear area, and this is achieved by eliminating the thread over a certain distance at the end of the plasticising zone 4, as shown in FIGS. 2 and 3.

In order to prevent premature plasticising of the material outside the plasticising zone 4 and in order to strengthen the action of a thermal shield 5 at the end of the screw 3, a cooling device 23 can be provided for the feed and pressure zone 10. Similarly, in order to facilitate plasticising of the material, a means 24 of heating the plasticising zone 4 can be provided.

It is obvious that the plasticising device described above can also be applied to other similar techniques such as bottle-blowing, tube-extruding and the like.

I claim:

1. Apparatus for injecting into a mold comprising,
   an elongated cylinder having an end wall provided with a relatively small opening therethrough,
   means for supplying granular thermoplastic material to the interior of the cylinder.
   a feed screw within the cylinder fixed against axial movement and rotatable for feeding the granular material axially toward said end wall,
   a terminal end of said screw being spaced from said end wall to provide a chamber, and
   means for supplying heat and confining it to the material within the chamber to render it viscous,
   whereby continued pressure of the solid material moved by the screw against the plasticized material in said spaced extrudes it through said opening in the end wall, wherein the means for confining the heat to the material within the chamber includes a thermal shield positioned at the terminal end of the screw for preventing heat flow thereto from the chamber.

2. Apparatus according to claim 1 including means to retain the material within a cylinder portion at the location of the feed and pressure zones in a solid state by maintaining said cylinder portion at a temperature below that at which the material becomes viscous.

3. Apparatus according to claim 1 in which a portion of the cylinder which surrounds the screw is grooved in order to prevent slipping of the granular material.

4. Apparatus according to claim 1 including means for varying the speed of rotation of the screw in order to vary the rate of flow of the viscous material through the opening in the end wall.

5. Apparatus according to claim 1 wherein the opening in the end wall is provided with an outlet nozzle provided with a valve therein for controlling flow of the viscous material therethrough.

6. Apparatus for injecting into a mold comprising, an elongated cylinder having an end wall provided with a relatively small opening therethrough, means for supplying granular themoplastic material to the interior of the cylinder, a feed screw within the cylinder fixed against axial movement and rotatable for feeding the granular material axially toward said end wall, a terminal end of said screw being spaced from said end wall to provide a chamber, and means for supplying heat and confining it to the material within the chamber to render it viscous, whereby continued pressure of the solid material moved by the screw against the plasticized material in said space extrudes it through said opening in the end wall, said cylinder including a portion thereof which surrounds the screw, mounted for rotation about its axis for controlling feed of the material by said screw.

7. Apparatus according to claim 6 including means for rotating the portion.

8. Apparatus in accordance with claim 7 including a brake member for controlling the speed of rotation of said portion.

9. Apparatus for injecting into a mold comprising, an elongated cylinder having an end wall provided with a relatively small opening therethrough, means for supplying granular thermoplastic material to the interior of the cylinder, a feed screw within the cylinder fixed against axial movement and rotatable for feeding the granular material axially toward said end wall, a terminal end of said screw being spaced from said end wall to provide a chamber, and means for supplying heat and confining it to the material within the chamber to render it viscous, whereby continued pressure of the solid material moved by the screw against the plasticized material in said space extrudes it through said opening in the end wall, the means for supplying the granular material to the cylinder being adjustable along the length thereof to vary the length of the path along which the material is fed by the screw.

10. Apparatus for injecting into a mold comprising, an elongated cylinder having an end wall provided with a relatively small opening therethrough, means for supplying granular thermoplastic material to the interior of the cylinder, a feed screw within the cylinder fixed against axial movement and rotatable for feeding the granular material axially toward said end wall, a terminal end of said screw being spaced from said end wall to provide a chamber, and means for supplying heat and confining it to the material within the chamber to render it viscous, whereby continued pressure of the solid material moved by the screw against the plasticized material in said space extrudes it through said opening in the end wall, a portion of the cylinder surrounding the screw being rotatable about its axis and provided with grooves internally thereof.

11. Apparatus according to claim 10 wherein said portion is provided by radially movable sections in which the grooves are located.

12. Apparatus according to claim 11 including a motor for rotating the portion counter to the rotation of the screw.

13. Apparatus according to claim 12 wherein a brake is provided to control the speed of rotation of said portion.

* * * * *